United States Patent
Yamami et al.

[11] Patent Number: 6,155,246
[45] Date of Patent: Dec. 5, 2000

[54] POWER CUTTER

[75] Inventors: Hirofumi Yamami; Giichi Iida, both of Tokyo, Japan

[73] Assignee: Kioritz Corporation, Tokyo, Japan

[21] Appl. No.: 09/038,874

[22] Filed: Mar. 11, 1998

[30] Foreign Application Priority Data

Mar. 24, 1997 [JP] Japan .................................. 9-087238

[51] Int. Cl.[7] .................................................. B28D 1/04
[52] U.S. Cl. ...................... 125/13.01; 451/453; 451/456
[58] Field of Search .................................. 451/453, 454, 451/456, 458; 125/13.01

[56] References Cited

U.S. PATENT DOCUMENTS

| 3,896,783 | 7/1975 | Manning | 125/13 R |
|---|---|---|---|
| 5,074,044 | 12/1991 | Duncan et al. | 30/124 |
| 5,084,972 | 2/1992 | Waugh | 30/124 |
| 5,167,215 | 12/1992 | Harding, Jr. | 125/13.01 |
| 5,184,598 | 2/1993 | Bell | 125/21 |
| 5,199,501 | 4/1993 | Kluber et al. | 173/75 |
| 5,327,649 | 7/1994 | Skinner | 30/124 |
| 5,440,809 | 8/1995 | Padilla | 30/124 |
| 5,653,218 | 8/1997 | Sakamoto et al. | 125/13.01 |
| 5,675,895 | 10/1997 | Mori et al. | 30/124 |
| 5,788,561 | 8/1998 | Pearlman et al. | 451/353 |

FOREIGN PATENT DOCUMENTS 679520  3/1994  Japan .

*Primary Examiner*—Joseph J. Hail, III
*Assistant Examiner*—William Hong
*Attorney, Agent, or Firm*—Baker Botts L.L.P.

[57] ABSTRACT

A power cutter which comprises a main body provided with a motor, a work-cutting portion including a circular cutting blade to be rotated by the motor and a safety cover covering both sides of an edge portion of the cutting blade so as to form a dust-discharging passageway, a fan attached to the safety cover for sucking and removing dust generated during cutting operations through the dust-discharging passage, a barrier wall attached to the safety cover so as to intercept the dust-discharging passageway, and a main dust-sucking port and a supplementary dust-sucking port disposed respectively in front of and behind the barrier wall as viewed in the rotational direction of the cutting blade.

7 Claims, 6 Drawing Sheets

POWER CUTTER

BACKGROUND OF THE INVENTION

1. Field of the Invention

This invention relates generally to a power cutter having a circular cutting blade which is adapted to be rotated by means of a motor, such as a small air-cooled two-stroke gasoline engine or an electric motor. In particular, the invention relates to a portable power cutter which is provided with a fan for sucking and removing dust generated in cutting concrete members, or the like, with the circular cutting blade.

2. The Prior Art

As described in Japanese Patent Publication H/7-14570, a portable power cutter provided with a fan for sucking and removing dust has been proposed or put into practical use. Namely, this conventional portable power cutter includes a main body provided with a motor, a circular cutting blade which is adapted to be rotated by the motor, a safety cover disposed on and covering both sides of an edge portion of the cutting blade so as to form a dust-discharging passageway, and a fan which is attached to the safety cover for sucking dust generated during cutting work using the circular cutting blade and removing the dust through the dust-discharging passage. A barrier wall is attached to the safety cover so as to substantially intercept the dust-discharging passageway, and a dust-sucking port for the fan is disposed in front of the barrier wall as viewed in the rotational direction of the cutting blade.

However, this conventional power cutter is subject to the following problem. Namely, since the aforementioned barrier wall is mounted so as to intercept the dust-discharging passageway as mentioned above, the barrier wall is required not only to be disposed over the outer periphery of the edge of the cutting blade but also extend to both sides of the edge portion of the cutting blade. In this case, a predetermined clearance must be maintained between the cutting blade and the portions of the barrier that extend on the sides of cutting edge portion. In other words, the extended portions of the barrier which are disposed on the sides of the cutting edge portion must be formed to have a slit-shaped opening having a predetermined width so as to allow the cutting blade to rotate therein without contact such extended portions.

However, if such a slit-shaped opening is formed in the barrier, a gap is inevitably formed between the cutting blade and the extended portions of the barrier. Therefore, the dust generated in cutting concrete members or the like inevitably leaks out through the gap toward the rear side of the cutting blade. Thus, a portion of the dust is discharged directly from the safety cover through the gap formed between the cutting blade and the extended portions of the barrier without being sucked through the dust-sucking port of the fan.

SUMMARY OF THE INVENTION

This invention has been made to cope with the aforementioned conventional problems. It is therefore an object of the invention to provide a power cutter which is capable of minimizing the quantity of dust that is discharged, without being sucked by the fan, directly to the external atmosphere through the gap between the cutting blade and the barrier wall.

With a view to realizing the aforementioned object, the power cutter according to this invention includes a main body provided with a motor, a work-cutting portion including a circular cutting blade which is adapted to be rotated by the motor, and a safety cover disposed on and covering both sides of an edge portion of the cutting blade so as to form, together with the cutting blade, a dust-discharging passageway. The safety cover includes a peripheral wall portion and side wall portions. A fan is attached to the safety cover for sucking dust generated during cutting work using the circular cutting blade and removing the sucked dust through the dust-discharging passage. A barrier wall within the dust discharging passageway and extending between the sidewall portions and peripheral wall portion of the safety cover substantially blocks the dust-discharging passageway. A main dust-sucking port and a supplementary dust-sucking port for the fan are disposed respectively in front of and behind the barrier wall as viewed in the rotational direction of the cutting blade.

If In a preferred embodiment of the power cutter according to the invention, the barrier is constituted by an outer peripheral wall portion which is disposed along an outer periphery of the cutting edge and by a pair of extended wall portions which are disposed on both sides of the cutting edge portion, wherein the pair of extended wall portions are separated by a slit-shaped opening having a predetermined width so as to allow the cutting blade to rotate without contact therewith.

In another preferred embodiment of the power cutter according to the invention, the barrier is disposed at a portion of the dust-discharging passage where the cross-sectional area thereof is approximately the largest.

In still another preferred embodiment of the power cutter according to the invention, most of the main dust-sucking port and the supplementary dust-sucking port are located outside the outer periphery of the cutting edge of the cutting blade, and both the main and the supplementary dust-sucking ports are non-circular in shape.

According to the power cutter of the invention, a main dust-sucking port is disposed in front, as viewed in the rotational direction of the cutting blade, of the barrier wall attached to the safety cover. At the same time, a supplementary dust-sucking port is disposed behind the barrier wall, as viewed in the rotational direction of the cutting blade, so that even if the dust generated in cutting concrete members or the like leaks out rearwardly (as viewed in the rotational direction of the cutting blade) through a gap formed between the cutting blade and the extended wall portions of the barrier, the dust leaked in this manner can be immediately sucked through the supplementary dust-sucking port by the fan. The dust sucked in by the fan is subsequently discharged and treated through a filter, etc.

Accordingly, it is possible according to the power cutter of the invention to minimize the quantity of dust that might be discharged, without being sucked by the fan, through the gap between the cutting blade and the barrier wall.

DETAILED DESCRIPTION OF A PREFERRED EMBODIMENT

The invention will be further explained with reference to the drawings depicting an illustrative embodiment of the invention.

Figure 1:
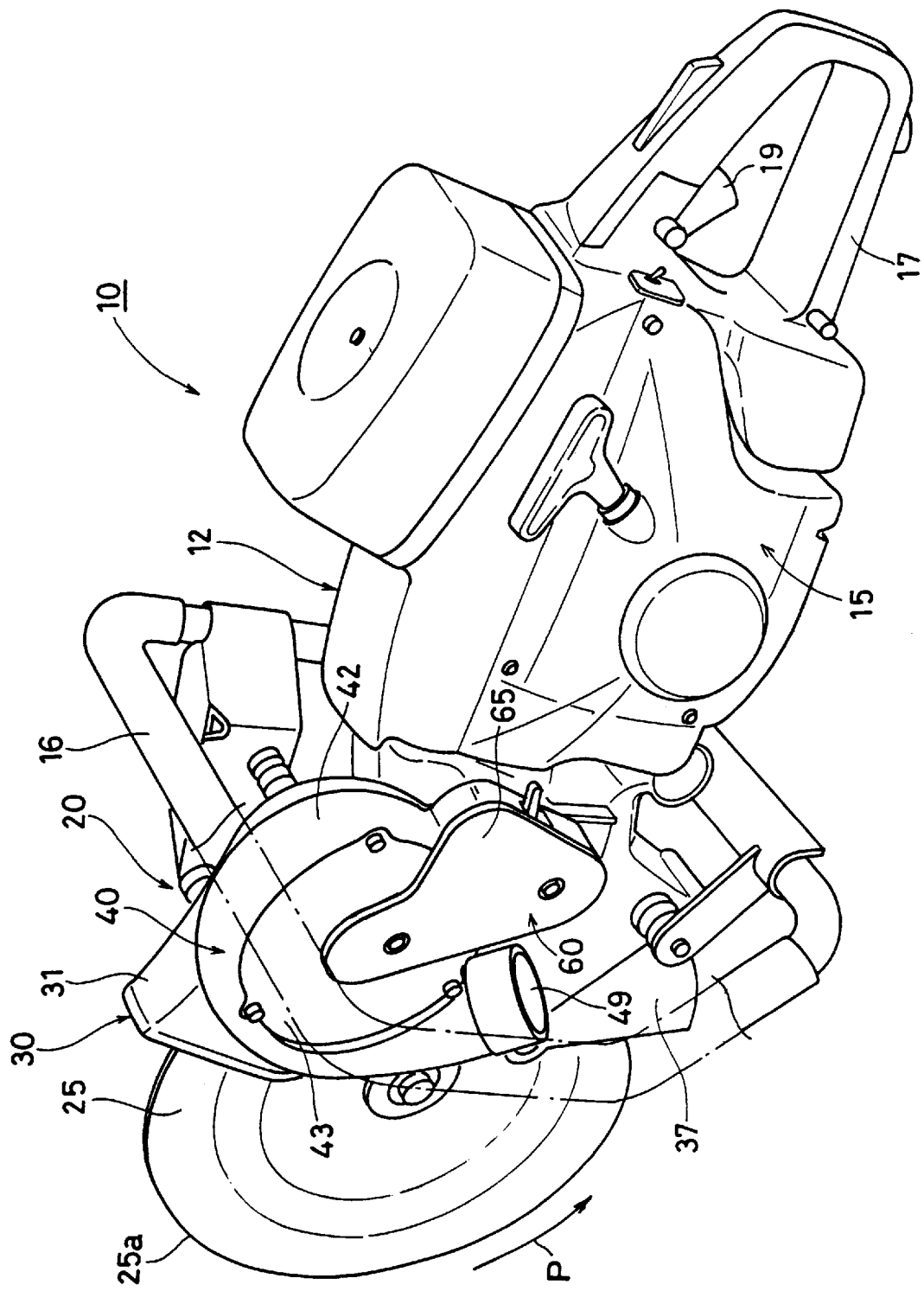
FIG. 1 is a general perspective view illustrating one embodiment of an engine cutter exemplifying a portable power cutter according to this invention.
Figure 2:
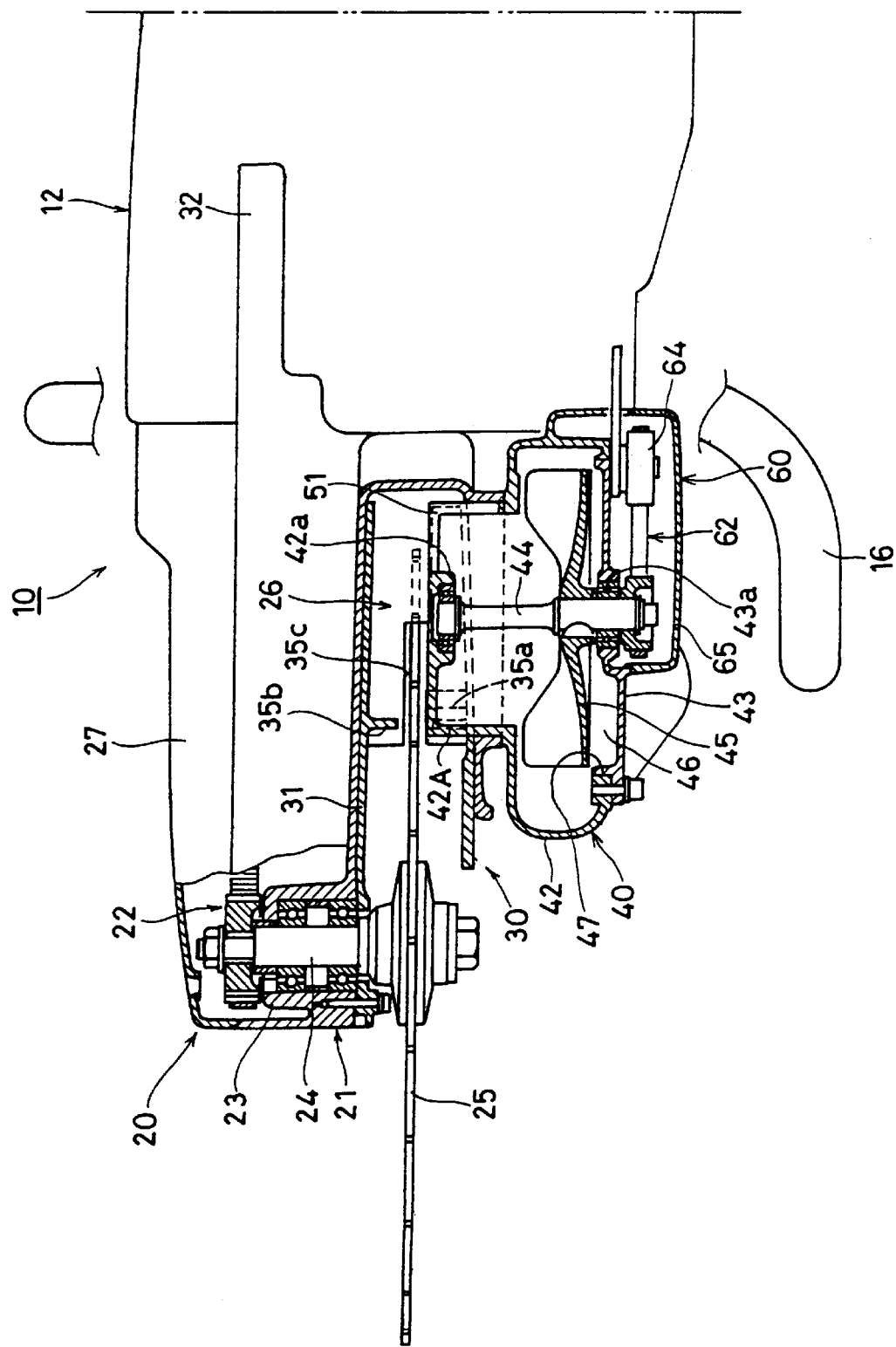
FIG. 2 is a partially sectioned plan view illustrating a main portion of the engine cutter shown in FIG. 1.

FIG. 1 shows a general perspective view illustrating one embodiment of an engine cutter 10 exemplifying a portable power cutter according to the invention. FIG. 2 is a partially sectioned plan view illustrating a main portion of the engine cutter 10 shown in FIG. 1.

The engine cutter 10 shown in FIG. 1 comprises a main body 12 which is provided at the central portion thereof with a small air-cooled two-stroke gasoline engine 15 (hereinafter referred to simply as an engine) functioning as a motor. To this main body 12 is attached a rear handle 17 extending in the longitudinal direction of the engine cutter 10 and being provided at the rear portion thereof with a throttle trigger 19, etc. A front handle 16 is attached to the main body 12 so as to extend upward from the central bottom portion of the main body 12 to cross over the upper forward portion of the main body 12.

As clearly seen from FIG. 2 in addition to FIG. 1, to the main body 12 is further attached a work-cutting portion 20. This work-cutting portion 20 includes a circular cutter (blade) 25 which is adapted to be rotated via an endless belt type power transmission mechanism 22 (only a portion thereof is shown) by the engine 15 and a safety cover 30 disposed on and partially covering both sides of an edge portion 25a of the cutter 25. A centrifugal fan 40 for sucking and discharging dust is attached to one of the side walls of the safety cover 30 of the work-cutting portion 20. The centrifugal fan 40 is adapted to be rotatably driven by the engine 15 via a first endless belt type power transmission mechanism (not shown) and a second endless belt type power transmission mechanism 62.

The safety cover 30 of the work-cutting portion 20 is provided with a cutting power transmission mechanism 21 housing the endless belt type power transmission mechanism 22, with a sector-shaped cover portion 31 partially covering both sides of an edge portion 25a of the cutter 25, and with a fixing member 32 for fixing the safety cover 30 to the main body 12. The cutter 25 is mounted on a drive shaft 24 which is rotatably received in a bearing portion 23 attached to the cutting power transmission mechanism 21 covered by a protective cover 27.

Figure 3:
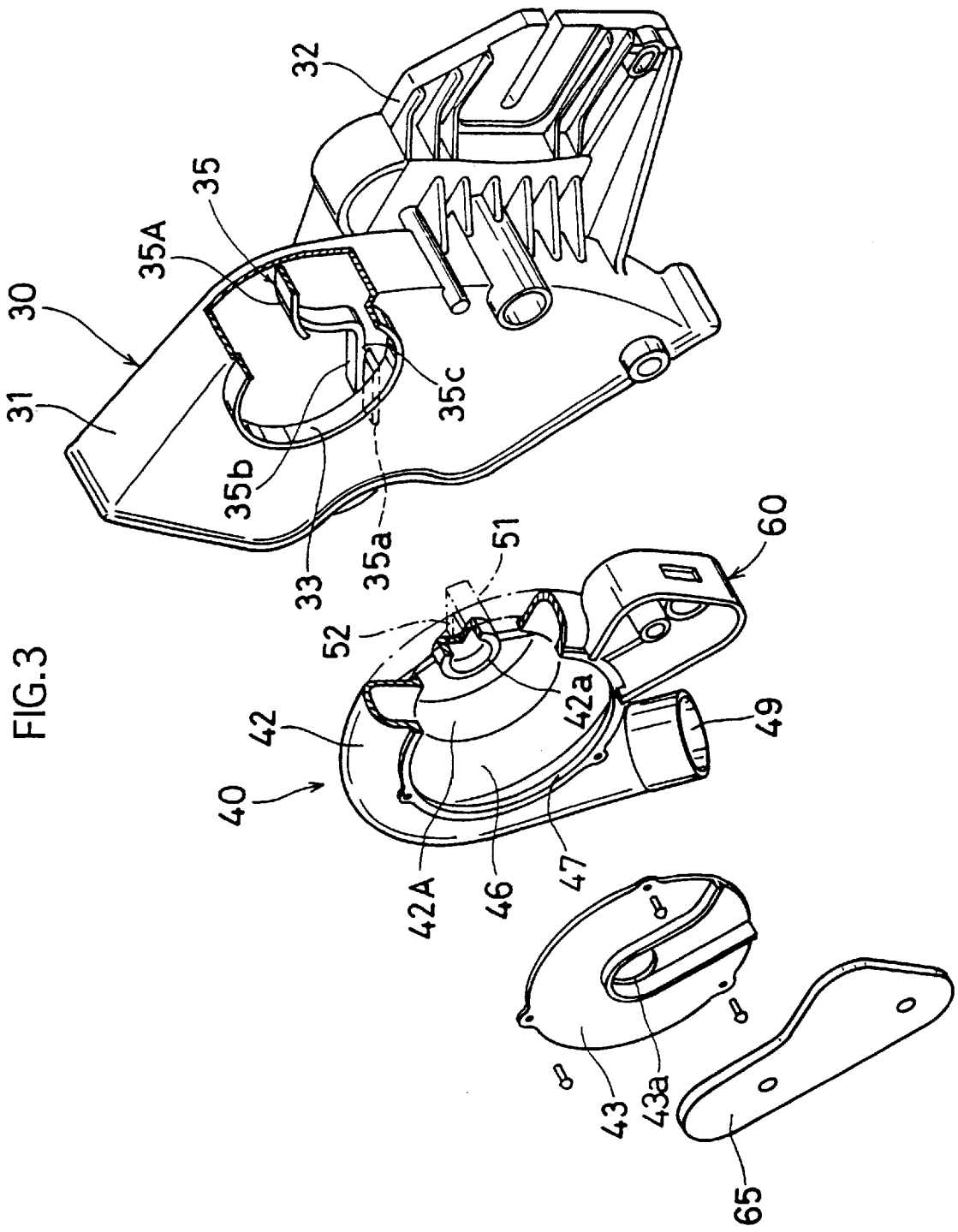
FIG. 3 is an exploded perspective view illustrating a safety cover, a fan case, etc. of the engine cutter shown in FIG. 1.
Figure 4:
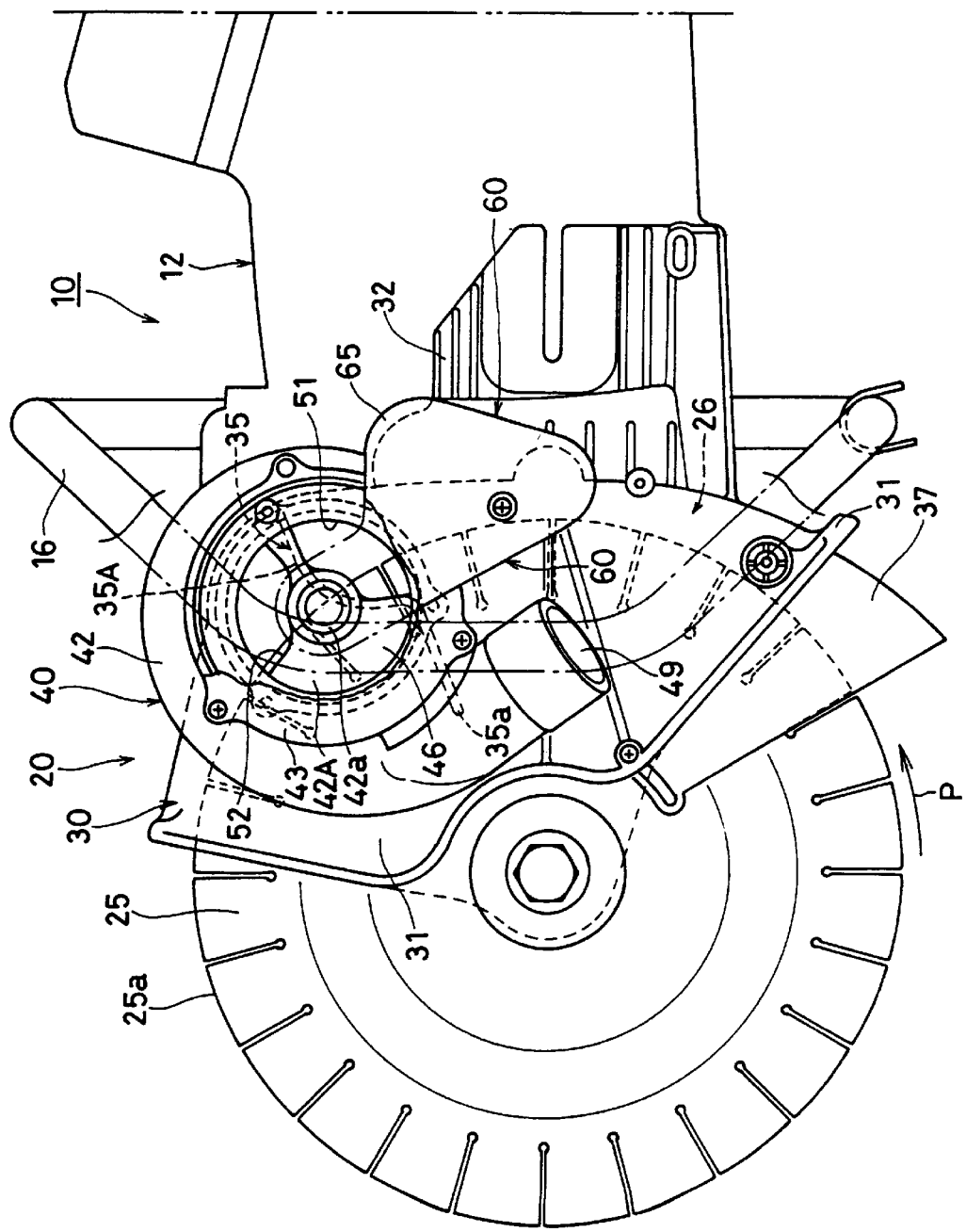
FIG. 4 is a partially sectioned left side view illustrating a main portion of the engine cutter shown in FIG. 1.
Figure 5:
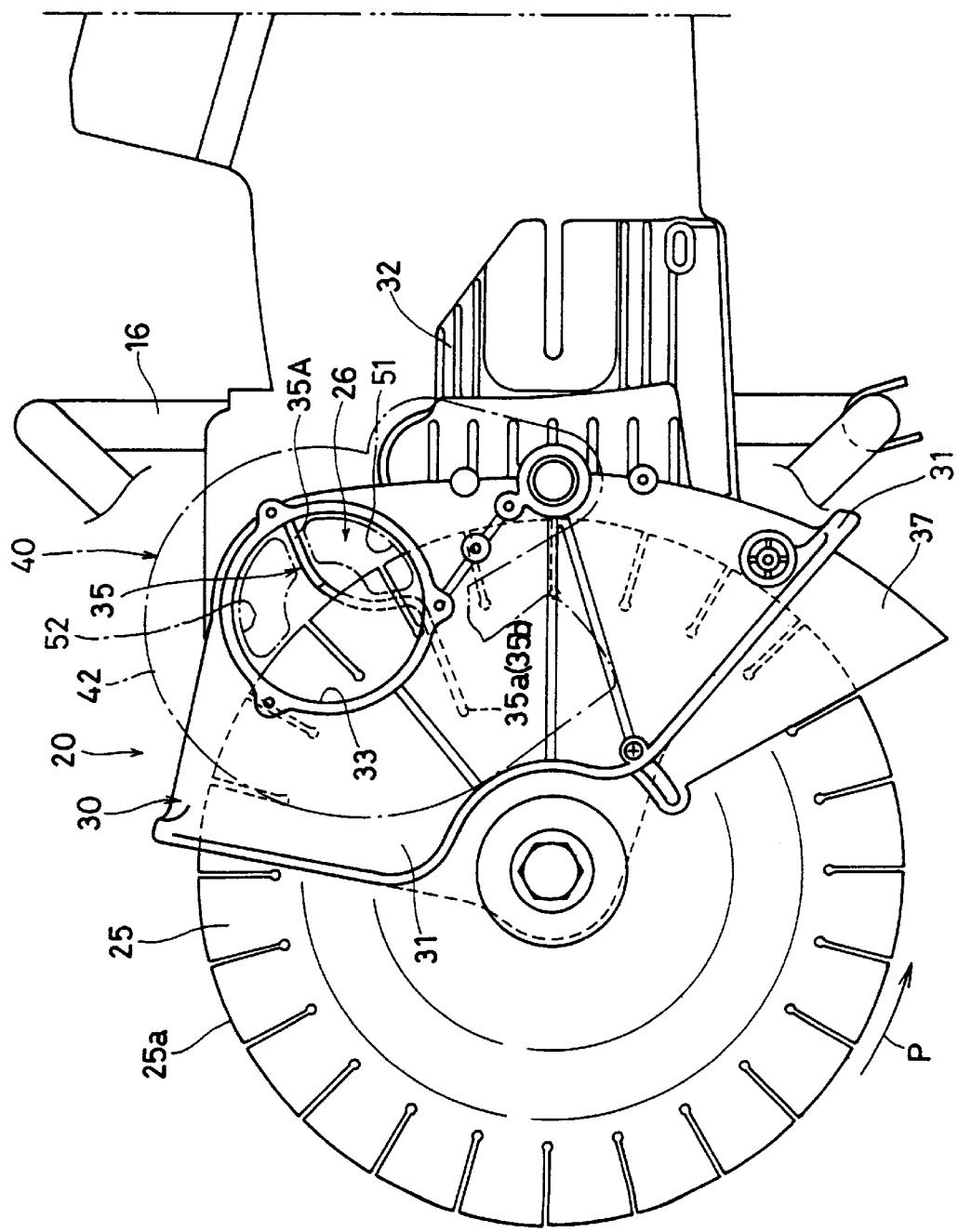
FIG. 5 is a left side view illustrating a main portion of the engine cutter shown in FIG. 1, wherein the fan shown in full lines in FIG. 4 is shown in phantom for clarity of the illustration.
Figure 6:
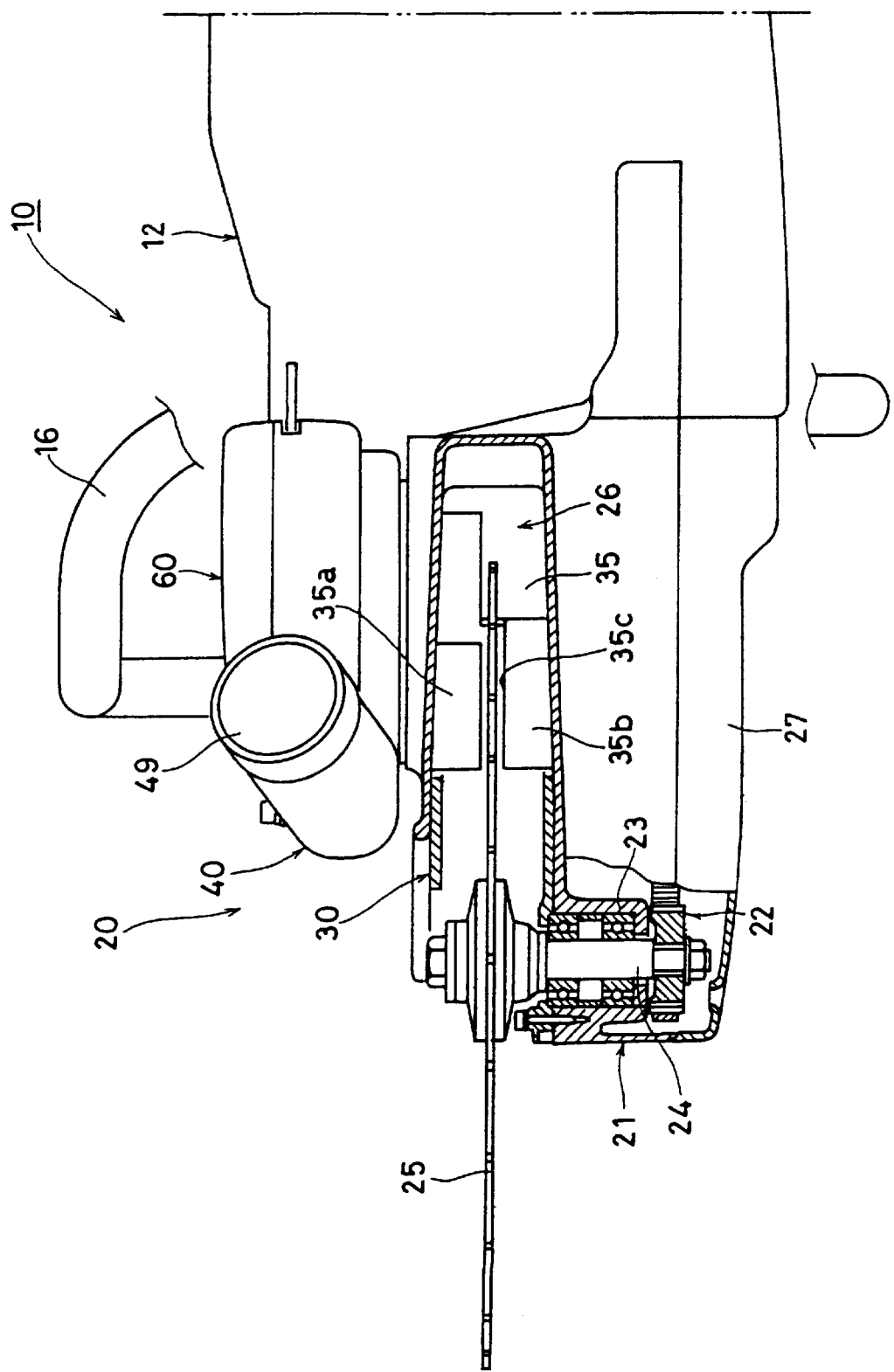
FIG. 6 is a partially sectioned bottom view of the safety cover (as viewed from the bottom thereof) of the engine cutter shown in FIG. 1.

As clearly seen from FIGS. 3 to 5, the safety cover 30 is provided with a fan-inserting opening 33, into which a bottomed cylindrical portion 42A formed at the center of a fan case 42 of the fan 40 is adapted to be inserted. A sector-shaped auxiliary cover 37 is attached to a lower portion of the cover portion 31 of the safety cover 30 in such a manner that it can be adjustably extended from the lower portion of the cover portion 31 (FIGS. 1 and 4). Accordingly, the dust that is generated in the cutting of concrete members, for example, by use of the cutter 25 is sucked through the lower end of the auxiliary cover 37 by the operations of the cutter 25 and the fan 40. The dust thus sucked through the lower end-of the auxiliary cover 37 is then transferred through a dust-discharging passageway 26 formed between the inner surface of the safety cover 30 and the outer periphery of the cutter 25 and along the rotational direction P of the cutter 25 (FIG. 4) to be processed further.

A barrier wall 35 is formed on the inside of the fan-inserting opening 33 of the cover portion 31 so as to substantially block the dust-discharging passageway 26. This barrier wall 35 is disposed at a portion of the dust-discharging passageway 26 which is approximately the largest in cross-sectional area. As clearly seen from FIGS. 2, 3, 5 (where the fan 40 is removed) and 6 (a view as seen from the bottom), the barrier wall 35 is constituted by an outer peripheral wall portion 35A which is disposed along an outer periphery of the cutting edge 25a of the cutter 25 and by a pair of extended wall portions 35a and 35b which are disposed on opposite sides of the cutting edge portion. These extended wall portions 35a and 35b are separated by a slit-shaped opening 35c having a predetermined width so as to allow the cutter 25 to rotate therebetween without contact therewith.

As clearly seen from FIGS. 2, 3, 4 and 6, the fan 40 is constructed as follows. Namely, the fan case 42 is provided with a housing portion 46 for housing an impeller 45 and, at the center thereof, with the bottomed cylindrical portion 42A which is adapted to be inserted into the fan-inserting opening 33 of the safety cover 30. The fan case 42 is also provided, at a portion opposite to the bottomed cylindrical portion 42A, with an opening 47 to which a fan cover 43 is coveringly fixed. The axle 44 of the impeller 45 is rotatably supported at the ends thereof by a bearing 42a mounted on the bottom cylindrical portion 42A and by a bearing 43a mounted on the fan cover 43. (See FIG. 2.) A transmitting mechanism 60 for the fan 40 is integrally attached to the outer surface of the fan cover 43. This transmitting mechanism 60 comprises the aforementioned second endless belt type power transmission mechanism 62, a belt tension clutch 64 interconnected with the second endless belt type power transmission mechanism 62, and a cover 65 covering the members 62 and 64.

The bottomed cylindrical portion 42A is provided with a main dust-sucking port 51 and also with a supplementary dust-sucking port 52 for the fan 40, which are disposed respectively in front of and behind the barrier wall 35 as viewed in the rotational direction P of the cutter 25. More specifically, the main dust-sucking port 51 and supplementary dust-sucking port 52 are arranged side by side and separated by a predetermined short distance along the rotational direction P of the cutter 25. In order to enlarge the opening area thereof, the main dust-sucking port 51 and supplementary dust-sucking port 52 are nearly sector-shaped, i.e. non-circular in shape, with their inner and outer brims being arched about the axis 44 of the impeller 45. Most of the openings of the main dust-sucking port 51 and supplementary dust-sucking port 52 are located outside of the cutting edge 25a of the cutter 25. Further, the rear brim portion of the main dust-sucking port 51, as viewed in the rotational direction P of the cutter 25, is located to agree with the fore-end face of the barrier wall 35.

According to the engine cutter 10 of this embodiment, the main dust-sucking port 51 is disposed in front of, as viewed in the rotational direction P of the cutter 25, the barrier wall 35 attached to the safety cover 30, and at the same time, the supplementary dust-sucking port 52 is disposed behind the barrier wall 35, as viewed in the rotational direction P of the cutter 25. Thus, even if the dust generated during cutting of concrete or like members leaks out rearward (as viewed in the rotational direction P of the cutter 25) through the slit-shaped opening 35c formed between the cutter 25 and the extended wall portions 35a and 35b, the dust leaked in such manner can be immediately sucked through the supplementary dust-sucking port 52 by the fan 40. The dust sucked by the fan 40 is subsequently discharged and treated through a filter, etc., connected to an outlet port 49 of the fan 40.

Accordingly, it is possible according to the engine cutter 10 of this embodiment to minimize the quantity of dust that might be discharged, without being sucked by the fan 40, through the gap between the cutter 25 and the barrier wall 35.

In the foregoing explanation, the present invention has been explained with reference to one embodiment. However, the present invention should not be construed to be limited to such embodiment, but may be variously modified within the spirit and scope of the claims.

For example, the size and shape of the main dust-sucking port 51 and the supplementary dust-sucking port 52 can be varied if desired. Further, the arrangements of the barrier wall 35, the main dust-sucking port 51 and the supplementary dust-sucking port 52 can be also modified in any suitable manner.

As can be seen from the foregoing description, according to the power cutter of the invention, in addition to a main dust-sucking port which is disposed in front of, as viewed in the rotational direction of the cutting blade, the barrier wall attached to the safety cover, a supplementary dust-sucking port is also disposed behind the barrier wall, as viewed in the rotational direction of the cutting blade. Therefore, even if the dust generated in cutting concrete members or the like leaks out rearwardly (as viewed in the rotational direction of the cutting blade) through the gap formed between the cutting blade and the extended wall portions of the barrier, the dust leaked in such manner can be immediately sucked through the supplementary dust-sucking port by the fan. Accordingly, the quantity of dust that might be discharged directly through the gap between the cutting blade and the barrier wall is minimized.

What is claimed is:

1. A power cutter, comprising:

a main body provided with a motor;

a work-cutting portion, including a circular cutting blade adapted to be rotated by said motor and a safety cover disposed over and covering both sides of an edge portion of said cutting blade so as to form, together with said cutting blade, a dust-discharging passageway within the safety cover, the safety cover including a peripheral wall portion and side wall portions;

a fan having a fan case with a bottomed cylindrical portion attached in an opening of said safety cover for sucking dust generated during a cutting operation using the circular cutting blade and removing the sucked dust from said dust-discharging passageway of the safety cover;

a barrier wall within the dust-discharging passageway and extending between the side wall portions and the peripheral wall portion of the safety cover so as to substantially block the dust-discharging passageway, the barrier wall having a slit for the cutting blade;

a main dust-sucking port formed in the bottomed cylindrical portion of the fan case and disposed in front of the barrier wall with respect to the rotational direction of the cutting blade, and a supplementary dust-sucking port formed in the bottomed cylindrical portion of the fan case and disposed behind the barrier wall with respect to the rotational direction of the cutting blade for sucking dust from the dust-discharging passageway that leaks past the barrier wall through the slit.

2. The power cutter according to claim 1, wherein said barrier wall is constituted by an outer peripheral wall portion disposed along an outer periphery of said cutting edge portion and by a pair of extended wall portions disposed on both sides of said cutting edge portion, said pair of extended wall portions being separated by a slit-shaped opening having a predetermined width to allow said cutting blade to rotate without contact with said extended wall portions.

3. The power cutter according to claim 1, wherein said barrier wall is disposed at a portion of said dust-discharging passage where the cross-sectional area of said passage is approximately the largest.

4. The power cutter according to claim 3 wherein most of said main dust-sucking port and most of said supplementary dust-sucking port are located outside the outer periphery of the cutting edge of said cutting blade.

5. The power cutter according to claim 3 wherein both said main dust-sucking port and said supplementary dust-sucking port are non-circular in shape.

6. The power cutter according to claim 1 wherein most of said main dust-sucking port and most of said supplementary dust-sucking port are located outside the outer periphery of the cutting edge of said cutting blade.

7. The power cutter according to claim 6 wherein both said main dust-sucking port and said supplementary dust-sucking port are non-circular in shape.

* * * * *